United States Patent [19]
Sauber

[11] Patent Number: 5,533,710
[45] Date of Patent: Jul. 9, 1996

[54] CABLE STRINGING ROLLER DEVICE

[76] Inventor: Charles J. Sauber, 10 N. Sauber Rd., Virgil, Ill. 60182

[21] Appl. No.: 402,122

[22] Filed: Mar. 10, 1995

[51] Int. Cl.$^6$ .................................................. E21C 29/16
[52] U.S. Cl. .................................................. 254/134.3 PA
[58] Field of Search ........................... 254/389, 401–403, 254/407, 411, 413, 409, 134.3 PA, 134.3 R, 134.3 FT

[56] References Cited

U.S. PATENT DOCUMENTS

| | | |
|---|---|---|
| 681,399 | 8/1901 | Miller ........................................ 254/389 |
| 805,338 | 11/1905 | Boyle ........................................ 254/409 |
| 1,385,276 | 7/1921 | Rose ......................................... 254/409 |
| 1,676,460 | 7/1928 | Reid .......................................... 254/411 |
| 1,794,998 | 3/1931 | Weinberger ................... 254/134.3 PA |
| 1,828,269 | 10/1931 | Wright ...................................... 254/389 |
| 3,584,837 | 6/1971 | Reilly, Sr. et al. . |
| 3,720,399 | 3/1973 | Bozeman, Jr. . |
| 3,837,623 | 9/1974 | Chadwick, Jr. . |
| 3,844,536 | 10/1974 | Chadwick, Jr. . |
| 3,905,581 | 9/1975 | Chadwick, Jr. . |
| 4,022,431 | 5/1977 | Houston et al. . |
| 4,189,828 | 2/1980 | Chadwick, Jr. . |

*Primary Examiner*—Robert C. Watson
*Attorney, Agent, or Firm*—Leydig, Voit & Mayer, Ltd.

[57] ABSTRACT

A cable installation roller or sheave assembly for temporarily supporting cable on a cross member of a pole during installation of the cable onto an insulator. The roller assembly has supporting brackets which include upstanding inwardly bent fingers spaced from one another for containing the cable. A roller which is bearing mounted for easy rotation is held between the brackets. A clamping base mountable to the cross member of a pole surrounds the insulator and in turn carries the bracket by way of a support arm made of insulated material. The support arm is attached to the clamp base and support brackets. The clamping base has knife-edged like forward fingers and a conical leading end of a screw clamp serve to bite into the cross member for secure holding during cable stringing. When the assembly clamp is released the cable can be lowered downwardly onto the insulator and then the assembly when rotated 90° releases itself from the cable. In one form, the support arm is mounted vertically for straight cable stringing runs while in another alternative the arm is angularly mounted for curved road or turned runs of cable.

11 Claims, 6 Drawing Sheets

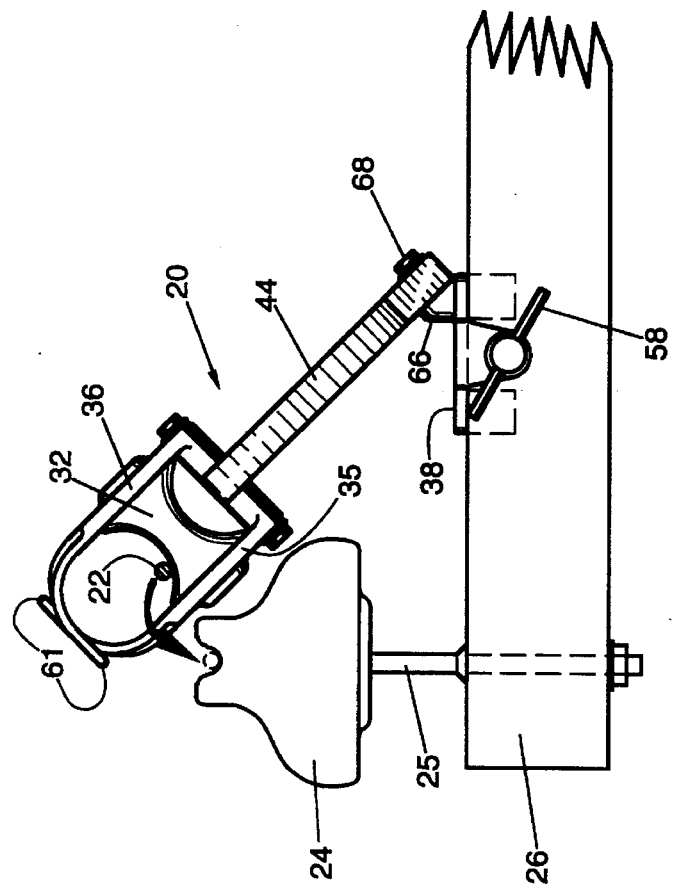
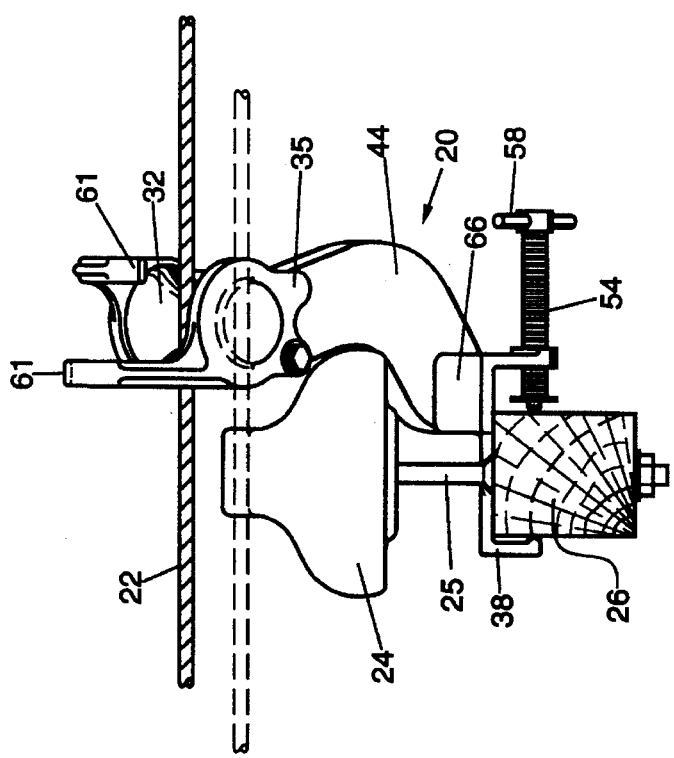

CABLE STRINGING ROLLER DEVICE

FIELD OF THE INVENTION

The present invention relates generally to roller sheaves for supporting cable during cable installation and more particularly to a cable stringing roller device for installation of cable.

BACKGROUND OF THE INVENTION

Various types of roller sheaves for stringing cable and transferring it to an insulator have been previously used in the art. One type as shown in FIG. 1, generally includes a support bracket A which is fixedly attached to a cross-bar B of a electrical pole. A sheave assembly C is connected via a clamping base D to the cross-bar and the sheave assembly may be positioned on the base at angular or perpendicular positions. Also the sheave assembly bracket has a cap E for containing the cable F which may be opened to transfer the cable to its final location on an insulator G.

These prior art cable stringing roller sheaves present many problems and difficulties during use. It is difficult, for example, to manipulate and move the sheave assembly between the vertical and either angular position.

In order to manipulate the cable from its first position resting on the sheave to a second position on the insulator, the cable must be physically lifted from the sheave angular position onto the insulator. The rotatable cap opens downwardly and it is difficult to manipulate for shifting of the cable.

In addition, the fastener used to close the rotating cap is hard to remove and may require tools to open and close.

The sheave assembly housing is connected to the base, as shown in FIG. 1, by means of a pin H which is tethered to the base by a chain I. The chain may easily be broken or separated permitting the pin to become lost. Furthermore, the position of the sheave assembly housing relative to the base is fixed during an installation and can only be changed between installations.

The roller sheave clamping base is difficult and time consuming to mount onto the cross member. Multiple fasteners J requiring tools are required to secure the base and may be easily lost or misplaced.

The present invention is directed toward overcoming one or more of the problems discussed above.

It is the primary object of the invention to provide a cable stringing roller or sheave which will allow simple and easy installation and an easier manipulation of the cable onto the insulator.

It is a related object of the invention to provide a cable stringing roller or sheave which eliminates the need for separable pins which may become lost or which may be needed as tether to the housing.

It is a further object of the invention to provide a cable stringing roller or sheave clamping base that is quicker and easier to install on a cross member.

Yet another object of the invention is to provide a cable stringing roller or sheave which may be more easily removed and securely clamped without tethers or fasteners which may be lost.

A further object of the invention is to provide a cable stringing roller or sheave that is relatively inexpensive to manufacture and assemble as well as easy to service.

Other objects and advantages of the invention will be apparent from the following detail description.

SUMMARY OF THE INVENTION

In accomplishing these and other objects of the invention, there is provided a cable installation roller or sheave assembly for temporarily supporting cable on a cross member of a pole during installation of the cable onto an insulator. The roller assembly has supporting brackets which include upstanding inwardly bent fingers spaced from one another for containing the cable. A roller which is bearing mounted for easy rotation is held between the brackets. A clamping base mountable to the cross member of a pole adjacent to the insulator and in turn carries the bracket by way of a support arm made of insulated material. The support arm is attached to the clamp base and support brackets. The clamping base has knife-edged like forward fingers and a conical leading end of a screw clamp serve to bite into the cross member for secure holding during cable stringing. When the assembly clamp is released the cable can be lowered downwardly onto the insulator and then the assembly when rotated 180° releases itself from the cable.

DESCRIPTION OF THE DRAWINGS

FIG. 8 is a side view of an alterative form of cable stringing roller device for pulling cable along curved FIG. 9 is a front view of the device of FIG. 8 positioned for/moving the cable on the insulator.

DESCRIPTION OF THE PREFERRED EMBODIMENT

While the invention will be described in connection with a particular preferred embodiment, it will be understood that it is not intended to limit the invention to that particular embodiment. On the contrary, it is my intention to cover all alternatives, modifications, and equivalents as may be included within the spirit and scope of the invention as defined by the appended claims.

Figure 2:
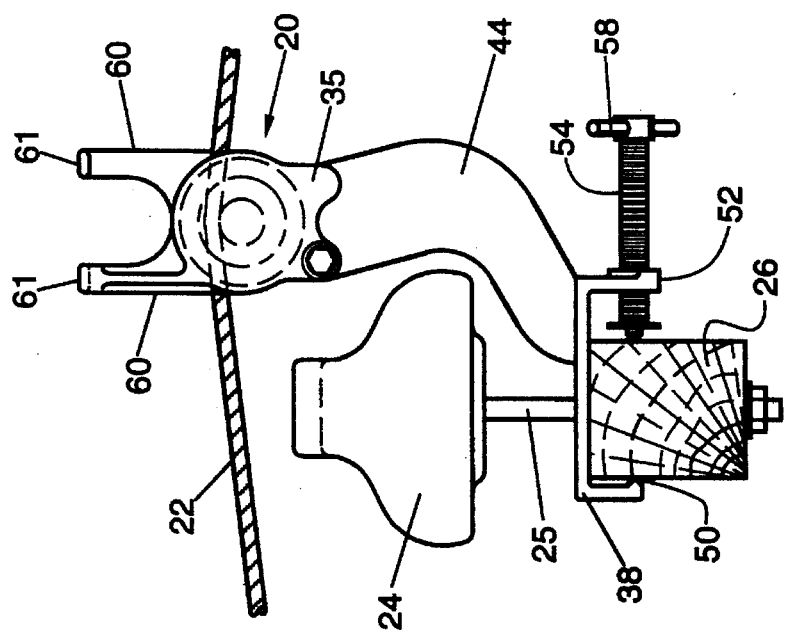
FIG. 2 is a side elevational view of a cable stringing rollover or sheave assembly embodying the present invention as installed on a cross member of a pole.

Now turning to the drawings, and referring first to FIG. 2, there is shown a cable stringing roller or sheave assembly 20 manufactured in accordance with the invention to support a cable 22 which is to be installed onto insulator 24 located on a cross member 26 of a utility pole (not shown). The roller or sheave assembly 20 is particularly suited for installation of cable 22 onto power distribution poles.

Figure 5:
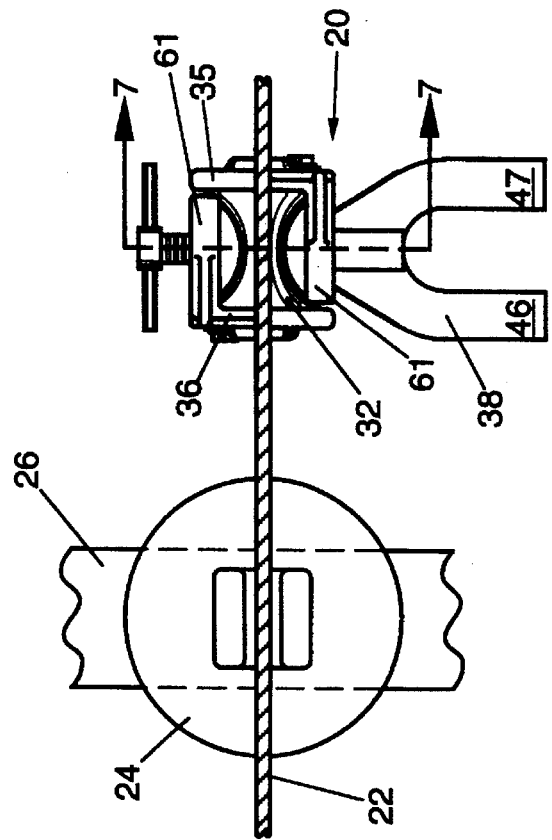
FIG. 5 is a top plan view showing the cable stringing roller device positioned for removal.
Figure 6:
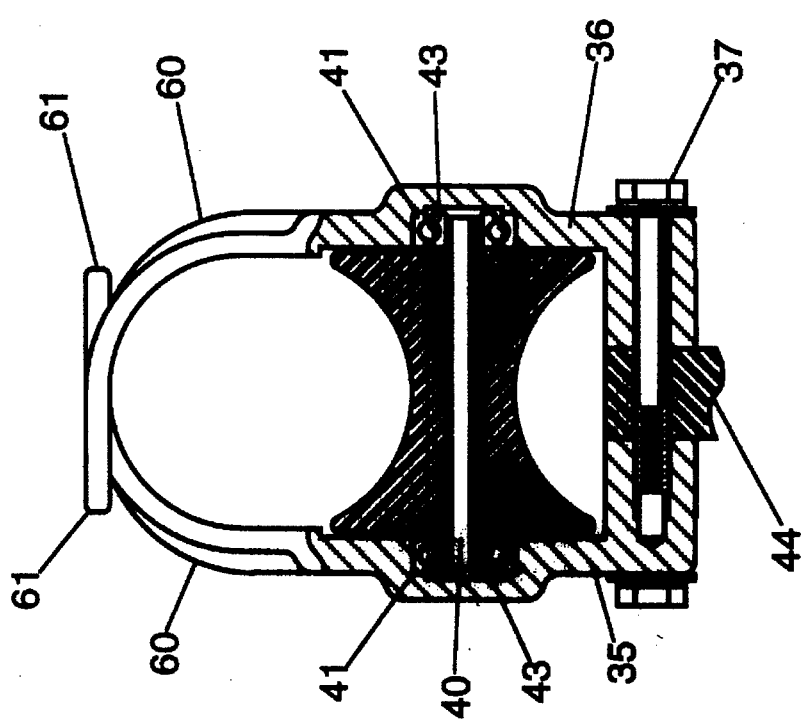
FIG. 6 is a partial sectional plan view taken along line 6—6 of FIG. 4.

The cable stringing roller or sheave assembly 20 has a freely rotatable roller 32 (FIGS. 4, 5, and 6) upon which the cable 22 is guided. The sheave means may take any suitable form, but preferably it is a circumferentially U-shaped cylinder or hyperboloid preferably made of a rubber or rubber-like insulating material on which the cable 22 matingly rides. A pair of bracket means 35, 36 (FIG. 6) provides support for the roller 32, preferably about a shaft 40 with bearings 41 at opposite ends held in cup shaped recesses 43 in the brackets. The brackets 35, 36 are connected to an arm 44 made of insulating material held together by fasteners 37 and supported by a clamping base means 38 (FIG. 7) which connects the roller assembly 20 to the cross member 26.

Figure 4:
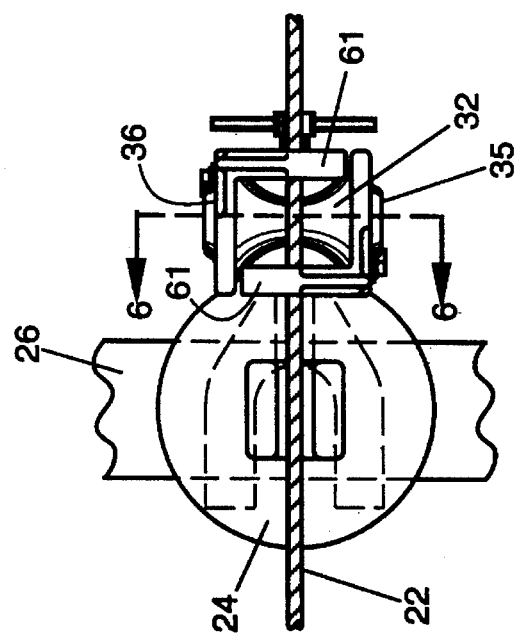
FIG. 4 is a/top plan view of the cable stringing roller device of FIG. 2.
Figure 7:
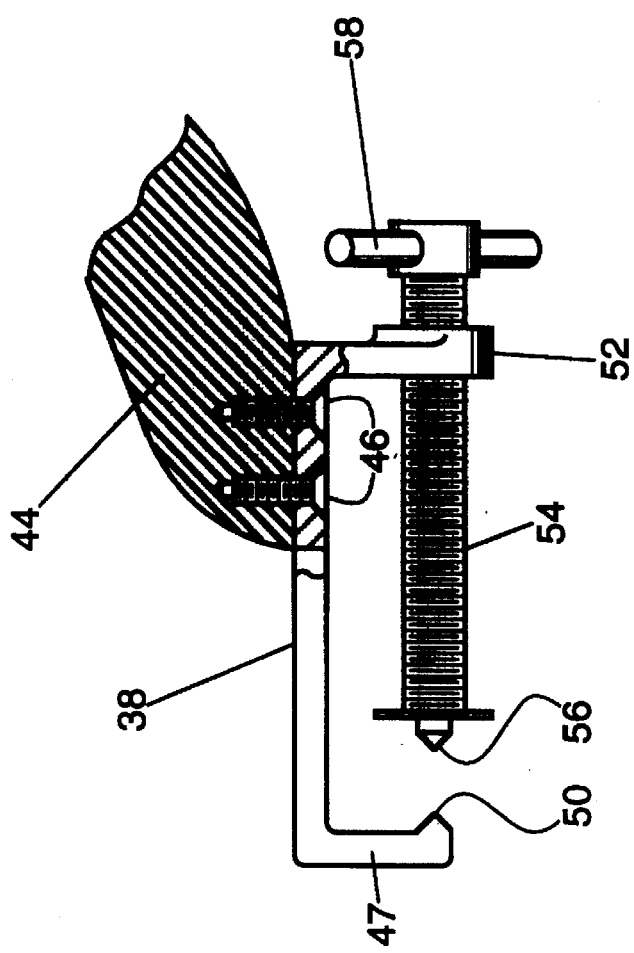
FIG. 7 is a fragmentary partial sectional view of the clamp and support arm.

The arm 44 in the present form of the invention, has a curved shape and is mounted vertically with the respect to the clamping base means 38 by way of a pair of screws 46 (FIG. 7). The clamping base means 38 may have any suitable shape and configuration, but preferably it is U-shaped with a pair of tines 46, 47 (FIG. 5) that have downwardly bent over ends and include inwardly projecting knife edges 50 that can bite into and securely engage with a cross member 26. On the opposite end of the clamping means bent over ends with knife edges, there is a depending bracket 52 which carries a rotatable screw means 54 with its inner end having a cone shape 56 to grip the cross member and the outer end of the screw means 54 has a shiftable handle pin 58 to assist in rotating the screw means. Referring to FIGS. 2 and 4, the roller assembly device 20 preferably for straight runs of cable can be mounted to the cross member 26 with the base member tines 46, 47 in the present instance positioned on opposite sides of the insulator 24 support bolt 25 with the cable 22 being strung passing over the roller 32 and being positioned directly over the top of the insulator 24. A support arm 44 which carries the roller brackets being made of insulating materials provides a fairly large size insulating gap between the supported cable and the clamping base 38.

Figure 1:
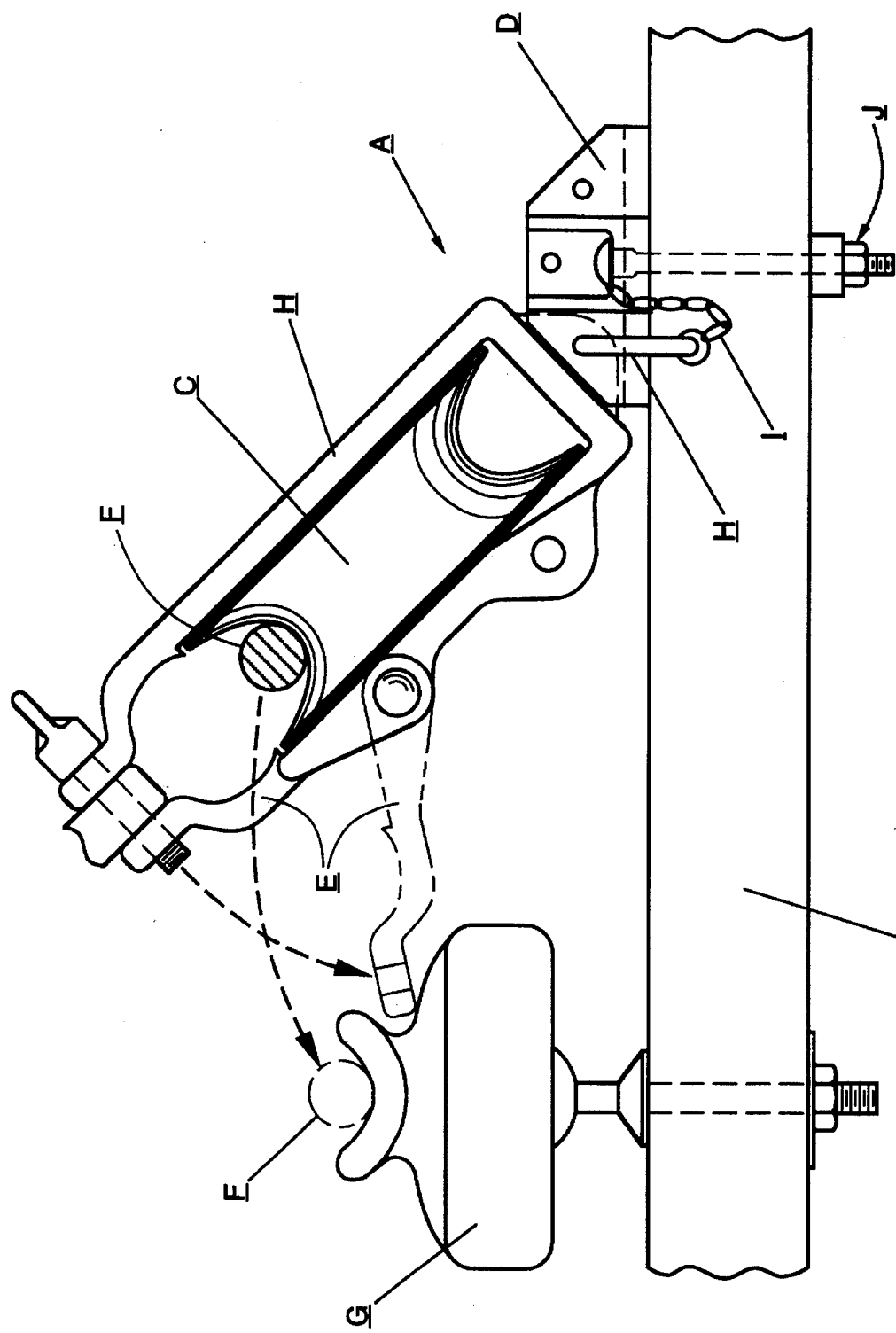
FIG. 1 is a frontal elevational view of a prior art cable stringing roller or sheave mounted on a cross bar showing the open position (in phantom) and closed position of the cap and an angular position of the cable sheave at cable installation.
Figure 3:
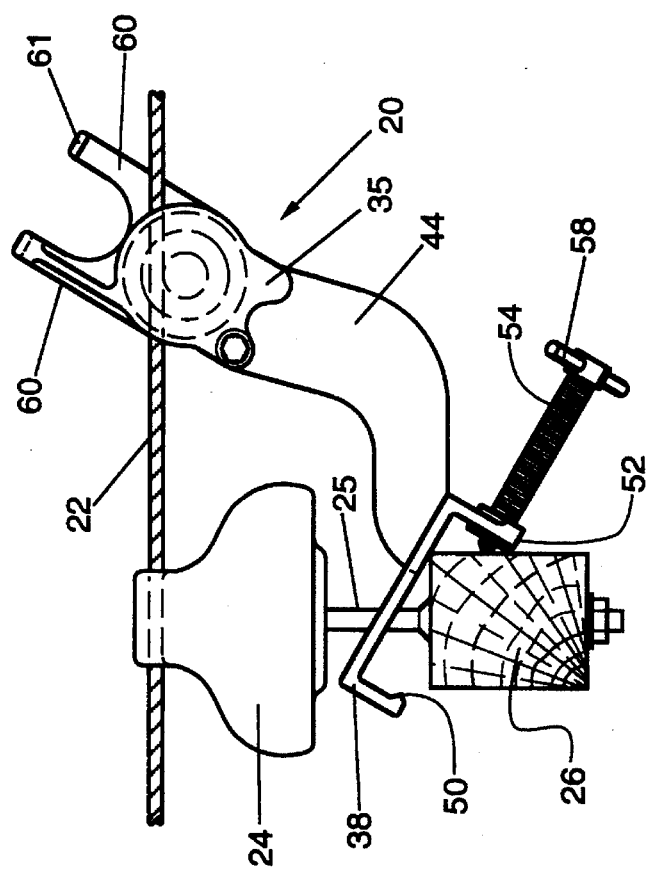
FIG. 3 is a side elevational view of a cable stringing roller device of the present invention showing the roller device in a removal position for lowering the cable on an insulator for cable stringing.

After the cable has been properly tensioned, the clamping screw 54 can be released as shown in FIG. 3 and then pivoted downwardly so the support arm and roller carrying brackets will allow the cable 22 to simply lower down onto the top of the insulator 24.

In accordance with one of the aspects of the present invention, the roller assembly devise 22 when released from the cross member will still in that downward position hang on the cable and then can be easily removed by rotating the device by about 90° to a position where it releases itself from the cable. In carrying out this aspect of the invention, the support brackets have upwardly projecting portions 60 that respectively terminate an inwardly projecting fingers 61 spaced from one another and oppositely oriented on respective brackets 35, 36. The bracket fingers 61 when disposed transverse to the direction of the cable provide a top guide or will preclude the cable from rising up out of the interior portion of the roller device. When the roller device is turned 90° with the bracket fingers 61 disposed parallel to the cable, the roller device can be released from the cable.

Figure 10:
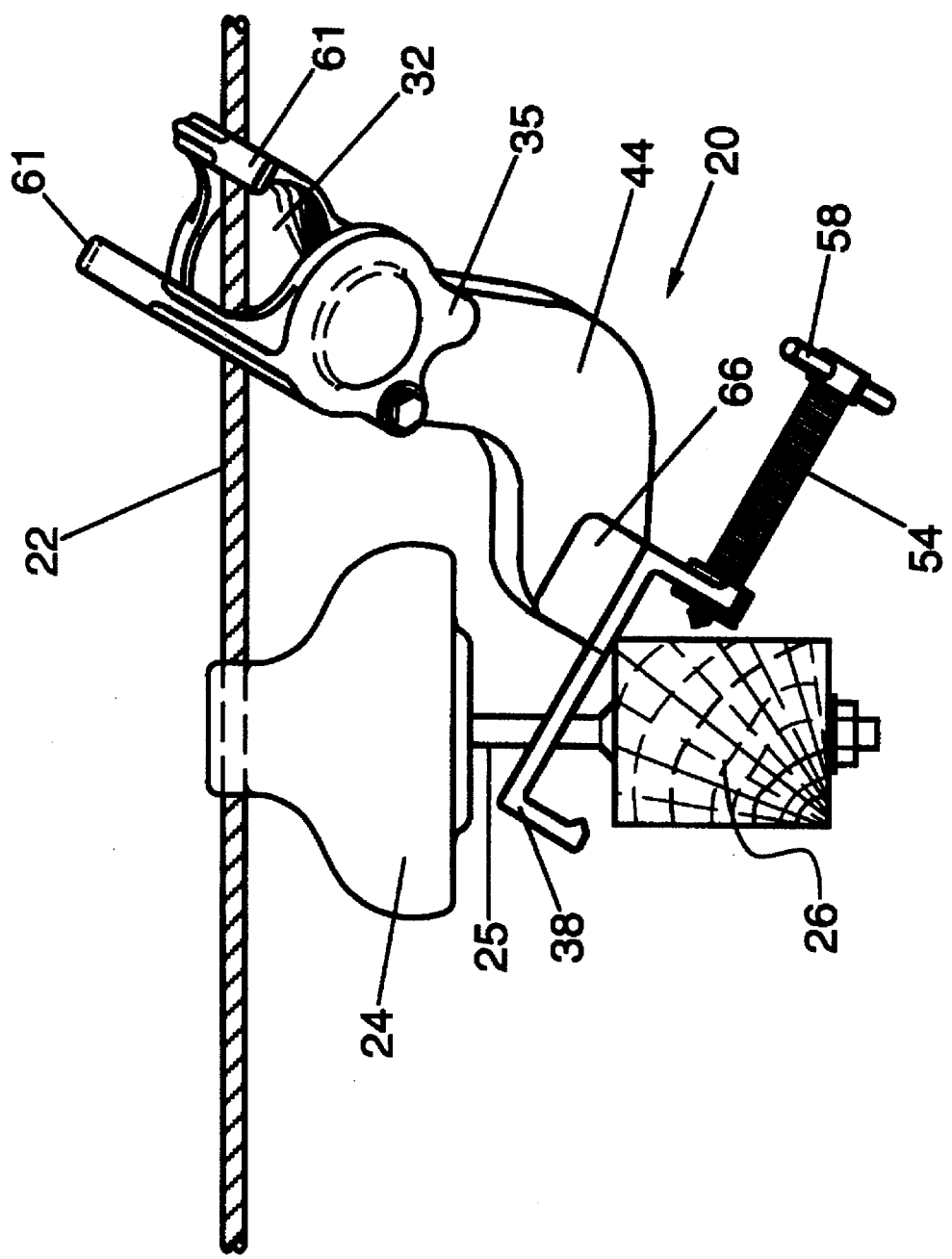
FIG. 10 is a side view of the device released from the cross bar for lowering the cable on to the insulator.

Referring to FIGS. 8, 9, and 10, there is shown an alternative form of the roller assembly device 20 where it is to be used with the pulling of cable along curved roads or where turns are to be made such that the stringing is not being done in simply a straight line. Here, the clamping means 38 is provided with a boss 66 that receives the support arm 44 mounted at an angle to the clamping base by bolt 68 (only one being shown) and the clamping means can then be secured to the cross member 26 adjacent to the insulator 24 but instead of with the clamping tines surrounding the insulator support bolt 25 so the clamping means 38 is positioned to one side of the insulator support bolt 25. It will be appreciated that the angular mounted arm arrangement may be on either side of the clamping base means to provide either rights or lefts or in some instances simply turning the clamping means around on the crossbar will provide use with the right or left turns for cable stringing.

I claim

1. A cable stringing roller device for temporarily supporting cable on a cross member of a pole during installation of the cable onto an insulator, said device comprising:

roller means for supporting the cable;

bracket means for supporting said roller means and for containing the cable, said bracket means having upwardly projecting portions disposed on opposite ends of said roller and terminating in inwardly projecting fingers spaced from one another;

support means connecting said bracket means to a clamping means adapted to clamp to said pole cross member adjacent to an insulator on the cross member and said clamping means having releasable means to allow the bracket and roller means to be shifted away from the cross member to lower the cable onto the insulator.

2. The cable stringing roller device of claim 1, wherein the support means is constructed of insulating material.

3. The cable stringing roller device of claim 1 wherein the clamping means includes gripping fingers on one side and a rotatable screw means on the other side for clamping to the pole cross member.

4. The cable stringing roller device of claim 3 wherein the clamping means gripping fingers include knife edges engageable with the cross member.

5. The cable stringing roller device of claim 3 wherein the end of the screw means engageable with the cross member includes a cone shape to grip the cross member.

6. The cable stringing roller device of claim 1 wherein the roller is constructed from resilient non-conductive material.

7. The cable stringing roller device of claim 6 wherein the roller is freely rotatable with bearing journal support at opposite ends held by said bracket means.

8. A cable stringing roller device for temporarily supporting cable on a cross member of a pole during installation of the cable onto an insulator, said device comprising:

roller means for supporting the cable;

bracket means for supporting said roller means and for containing the cable, said bracket means having upwardly projecting portions disposed on opposite ends of said roller and terminating in inwardly projecting fingers spaced from one another to provide an opening transverse to the roller axis;

support means connecting said bracket means to a clamping means having a C-shaped base and screw clamp means adapted to clamp to said pole cross member adjacent to an insulator on the cross member, and said support means being constructed of rigid insulating material.

9. A cable stringing roller device for temporarily supporting cable on a cross member of a pole during installation of the cable onto an insulator, said device comprising:

freely rotatable roller means for supporting the cable;

a pair of brackets disposed on opposite ends of said roller for supporting said roller means and for containing the cable, said bracket means having upstanding and inwardly bent fingers spaced from one another for containing the cable; and support means connected to each of said brackets and to a C-shaped clamping means adapted to clamp to said pole cross member adjacent to an insulator on the cross member.

10. A cable stringing roller device as claimed in claim 9 wherein said support means is angularly connected to said clamping means.

11. A cable stringing roller device as claimed in claim 10 wherein said support means is made of insulating material.

* * * * *